(No Model.)

C. F. HANNEMAN.
COOKING STOVE.

No. 312,461. Patented Feb. 17, 1885.

WITNESSES:
Theo. G. Hoster
C. Sedgwick

INVENTOR:
C. F. Hanneman
BY Munn & Co
ATTORNEYS.

UNITED STATES PATENT OFFICE.

CHARLES FREDERICK HANNEMAN, OF AHNAPEE, WISCONSIN.

COOKING-STOVE.

SPECIFICATION forming part of Letters Patent No. 312,461, dated February 17, 1885.

Application filed May 2, 1884. (No model.)

*To all whom it may concern:*

Be it known that I, CHARLES F. HANNEMAN, of Ahnapee, in the county of Kewaunee and State of Wisconsin, have invented a new and Improved Cooking-Stove, of which the following is a full, clear, and exact description.

The object of my invention is to provide a new and improved cooking-stove provided with special facilities for baking bread in the most perfect manner.

My invention is an improvement in the class of baking-ovens having a vertically-adjustable bottom plate, and means for emitting steam into the oven when the latter is in use.

The improvement relates to improved means for raising and lowering the oven-plate, and to an improvement in the construction and arrangement of the steam generator and discharger, as hereinafter described and claimed.

Reference is to be had to the accompanying drawings, forming part of this specification, in which similar letters of reference indicate corresponding parts in both the figures.

Figure 1:
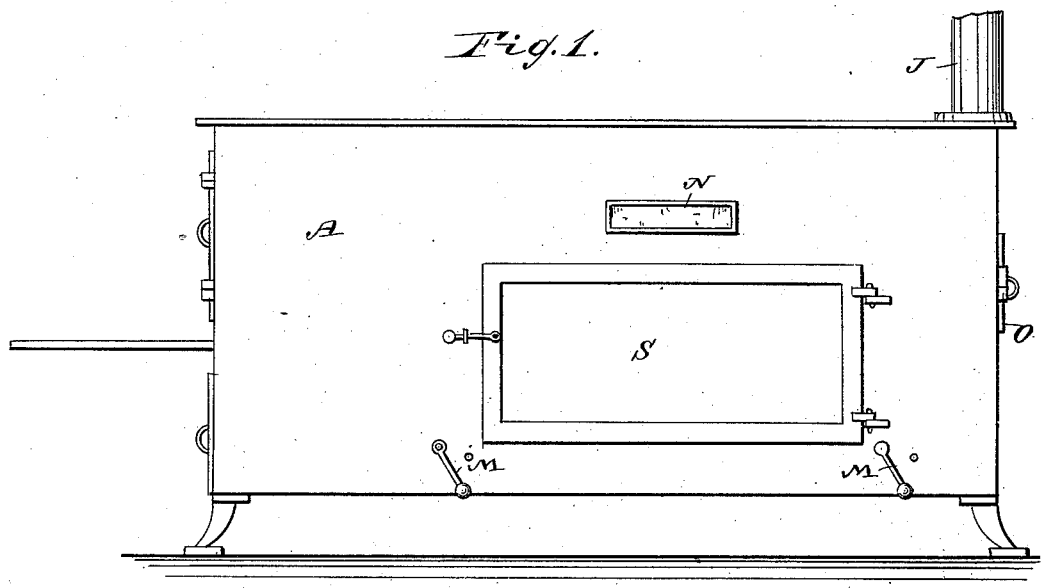
Figure 2:
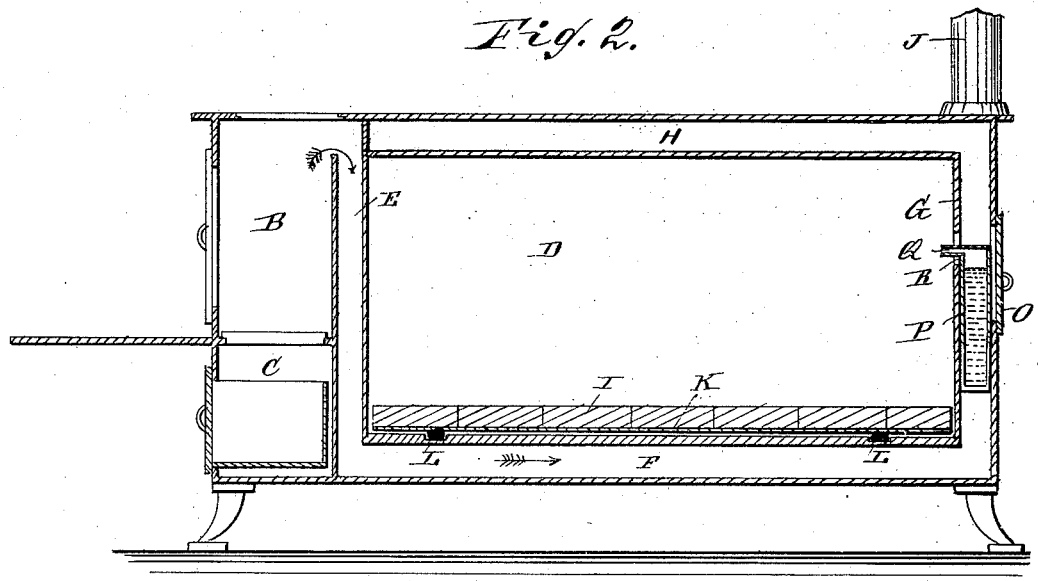

Figure 1 is a longitudinal elevation of my improved cooking-stove. Fig. 2 is a longitudinal sectional elevation of the same.

The stove A is provided with a fire-box, B, and below with an ash-pit, C, and behind the fire-box and the ash-pit a baking-oven, D, is located.

From the top of the fire-box a flue, E, extends downward on the rear surface of the back wall to a flue or chamber, F, below the baking-oven D, which flue or chamber F is connected with an upwardly-projecting flue, G, which is connected with a horizontal flue, H, extending over the top of the oven and back to the smoke-pipe J.

On the bottom plate of the oven D an iron plate, K, rests, on which fire-bricks I, about one inch thick, rest.

Two bars, L, having an oval cross-section, rest on the bottom of the oven, preferably in grooves below the plate K, which bars L are provided at the ends with handles M for turning them.

The oven is provided with a low door, S, and above the door with an opening covered by a piece of isinglass, N.

In the rear wall of the stove an opening is formed which is closed by a door, O. Through the said opening a vessel, P, containing water can be placed in the flue, G, which vessel is provided at its top with a neck, Q, projecting through an opening, R, in the back end of the oven into the said oven. The stove is provided with a suitable damper.

The smoke and other products of combustion pass from the fire-box through the flue E, under the oven D, up through the flue G, over the top of the oven, and then to the stove-pipe J, thereby heating the top and bottom of the oven. The water in the vessel P is heated and the steam generated passes through the neck Q into the oven, the steam in the oven being absolutely necessary for perfect baking.

If the bricks I are too hot, the bars L are turned to raise the plate K and the bricks I thereon, and form an air-space between the plate K and the bottom of the oven.

As the door S is very low no steam can escape if the door is opened. The contents of the oven can be examined without opening the door by looking through the isinglass pane N.

Steam has been intermittently discharged into bakers' ovens from a pipe leading to an exterior generator, for the purpose of glazing crackers, &c. My invention is different from and superior to such arrangement in the following particulars: first, a continuous discharge of steam is maintained during the baking operation, and since the amount of steam generated is proportionate to the degree of heat the quantitative relation of moisture to temperature and rapidity of the baking remains practically the same; second, the position of the water-holding vessel P is such that access thereto for the purpose of supplying water is easy, and it is, moreover, entirely out of the way, so that the oven-space may be entirely utilized for the usual purpose.

Having thus described my invention, I claim as new and desire to secure by Letters Patent—

1. A baking-oven provided with a flue containing a water-holding vessel provided with a neck projecting into the oven, substantially as herein shown and described.

2. The combination, with a stove provided with an oven and a door, O, in its rear, of the vessel P, having a neck, Q, projecting into the oven, substantially as herein shown and described.

3. The combination, with the vertically-adjustable oven-plate, of the bars which extend beneath it and have an oval cross-section, and also project through the side of the oven and are adapted for rotation, substantially as shown and described.

CHARLES FREDERICK HANNEMAN.

Witnesses:
D. W. STEBBINS,
A. J. McDONALD.